Aug. 3, 1948.  O. H. DUNLAP  2,446,218
UNIVERSAL BUMPER CLAMP
Filed Sept. 30, 1947
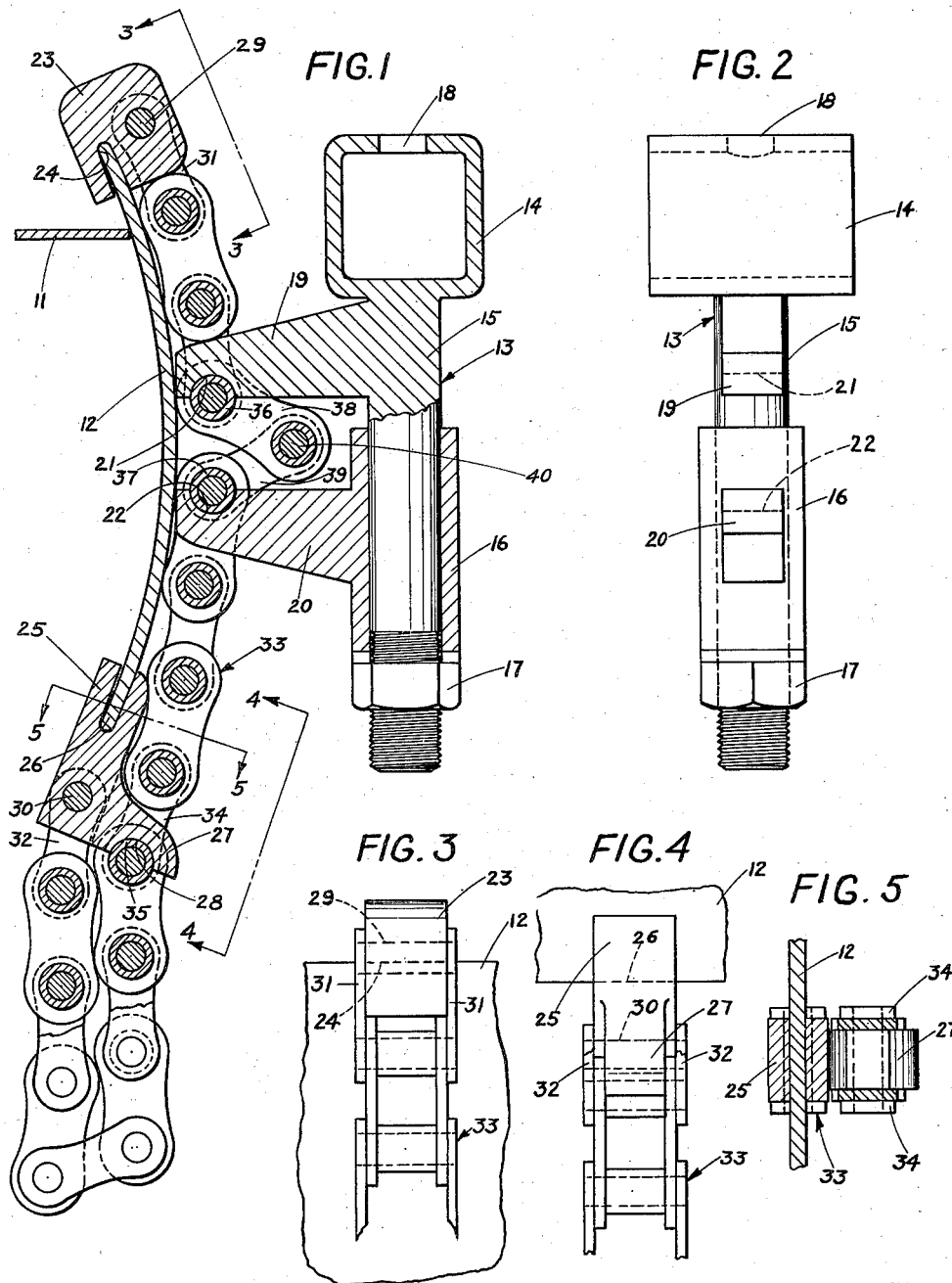
INVENTOR.
ORVILLE H. DUNLAP
BY
McMorrow, Berman & Davidson
Attorneys Patented Aug. 3, 1948

2,446,218

UNITED STATES PATENT OFFICE 2,446,218

UNIVERSAL BUMPER CLAMP

Orville H. Dunlap, Vashon, Wash.

Application September 30, 1947, Serial No. 776,963

4 Claims. (Cl. 280—33.15)

This invention relates to clamp devices, and more particularly to a clamp device for attaching a trailer hitch structure or the like to an automobile bumper.

A main object of the invention is to provide a novel and improved clamp device suitable for attachment to an automobile bumper, said clamp device being very simple in construction, easy to install and providing a very secure grip on the bumper.

A further object of the invention is to provide an improved trailer hitch structure adapted to be fastened to automobile bumpers over a wide range of automobile body designs, the clamping means employed being engageable merely with the top and bottom edge portions of the bumpers, whereby no encirclement of the bumpers is required, thus enabling the hitch device to be attached to a vehicle without alteration or marring of the body of the vehicle.

Further objects and advantages of the invention will become apparent from the following description, and claims, and from the accompanying drawings, wherein:

Figure 1 is a vertical cross-sectional view taken through a trailer hitch device constructed in accordance with the present invention and shown mounted on an automobile bumper.

Figure 2 is a front elevational detail view of the main body portion of the hitch device of Figure 1.

Figure 3 is a detail elevational view taken on line 3—3 of Figure 1.

Figure 4 is a detail elevational view taken on line 4—4 of Figure 1.

Figure 5 is a detail cross-sectional view taken on line 5—5 of Figure 1.

In many modern automobile body designs the space between the body and the rear bumper is spanned by a metal splash plate, also functioning to enhance the streamlined appearance of the body. Such a splash plate is shown at 11 in Figure 1, the rear bumper being designated at 12. Under these conditions, the conventional trailer hitch structure usually cannot be secured to the rear bumper without cutting away parts of the splash plate 11, since most conventional hitch structures employ bumper clamps which substantially encircle the bumper. A main purpose of the present invention is to obviate the necessity of cutting or modifying the splash plate when the hitch structure is to be fastened to the bumper.

Referring to the drawings, 13 designates a trailer hitch main body member, said body member comprising a top sleeve element 14 carried on a vertical post member 15 which is received in a bottom vertical sleeve member 16 and secured thereto, as will be presently described, by a nut 17 threaded on the lower end portion of said post member 15. The top sleeve element 14 is formed with an aperture 18 in its top wall for receiving the hitch pin of a conventional trailer hitch.

Projecting forwardly from the main body member 15 below the top sleeve member 14 is an arm 19, and projecting forwardly from the bottom sleeve 16 is an arm 20, parallel to and of equal length with arm 19. At their opposing end portions, arms 19 and 20 are formed with respective semi-cylindrical transverse recesses 21 and 22.

Engaging the top edge of bumper 12 is a lug member 23 formed with a groove 24 in which the bumper top edge is received. Engaging the bottom edge of the bumper is a second lug member 25 formed with a groove 26 in which the bottom edge of the bumper is received. Lug member 25 is formed with a rearwardly projecting arm 27 which is formed at its underside with a semi-cylindrical transverse recess 28.

Secured to the respective lug members 23 and 25, at 29 and 30 respectively are the end links 31 and 32 of a length of sprocket chain 33. The arm 27 fits between the side links 34, 34 of the chain 33 and receives a connecting pin sleeve 35 of the chain in its bottom semi-cylindrical recess 28. Received in the respective semi-cylindrical recesses 21 and 22 of the arms 19 and 20 are the connecting pin sleeves 36 and 37 at the ends of the respective pairs of adjacent chain links 38 and 39, the planes of said adjacent pair of chain links being angled towards each other by the clamping action of the arms 19 and 20 as the nut 17 is tightened, the pin connection 40 between said angled pairs of links being received between said arms 19 and 20, as shown in Figure 1. The clamping action thus obtained causes the links of the chain to conform to the curvature of the bumper 12, no matter how sharply it is curved, and provides clamping tension at the lug members 23 and 25 to firmly secure them to the top and bottom edges of the bumper. At the same time, the body member 13 is rigidly secured to said bumper.

The body member 13 is readily detachable from the bumper 12 by merely loosening the nut 17. The chain 33 is of sufficient length to allow the device to fit a wide range of bumper shapes and sizes.

While a specific embodiment of a bumper clamp structure for a trailer hitch has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A bumper clamp for a trailer hitch comprising a top lug adapted to engage the top edge of a bumper, a bottom lug adapted to engage the bottom edge of the bumper, a length of sprocket chain connecting said top and bottom lugs, a body member having an arm adapted to engage downwardly on a transverse pin of said chain, said body member having a depending rod portion, a sleeve member slidably mounted on said rod portion, an arm carried by said sleeve member adapted to engage upwardly against a second transverse pin of said chain, and a nut threaded on the lower end of said rod portion adapted to bear upwardly on said sleeve member to tense said chain.

2. A bumper clamp for a trailer hitch comprising a top lug grooved to engage the top edge of a bumper, a bottom lug grooved to engage the bottom edge of said bumper, a length of sprocket chain connecting said top and bottom lugs, an arm carried by said bottom lug adapted to engage downwardly on a transverse pin of said chain to resist upward movement thereof, a body member having an arm adapted to engage downwardly on a second transverse pin of said chain, said body member having a depending rod portion, a sleeve member slidably mounted on said rod portion, an arm projecting from said sleeve member adapted to engage upwardly against a third transverse pin of said chain, and a nut threaded on the lower end of said rod portion adapted to bear upwardly on said sleeve member to tense said chain.

3. A bumper clamp for a trailer hitch comprising a top lug grooved to engage the top edge of a bumper, a bottom lug grooved to engage the bottom edge of said bumper, a length of sprocket chain connecting said top and bottom lugs, an arm carried by said bottom lug formed with a recess in its bottom surface adapted to engage over a transverse pin of said chain to resist upward movement thereof, a body member having an arm projecting therefrom formed with a recess in its bottom surface adapted to engage over a second transverse pin of said chain, said body member having a depending rod portion, a sleeve member slidably mounted on said rod portion, an arm projecting from said sleeve member formed with a recess in its top surface adapted to engage under a third transverse pin of said chain, and a nut threaded on the lower end of said rod portion adapted to bear upwardly on said sleeve member to tense said chain.

4. A bumper clamp comprising a lug adapted to engage one edge of a bumper, a second lug adapted to engage the opposite edge of the bumper, a length of sprocket chain connecting said lugs, a body member having an arm adapted to engage a first transverse pin of said chain, said body carrying a rod portion, a sleeve member slidably mounted on said rod portion, and arm carried by said sleeve member adapted to engage a second transverse pin of said chain, and a nut threaded on said rod portion adapted to bear against said sleeve member to move the arm thereof toward the arm of said body member to thereby tense the chain.

ORVILLE H. DUNLAP.